Figure 1:
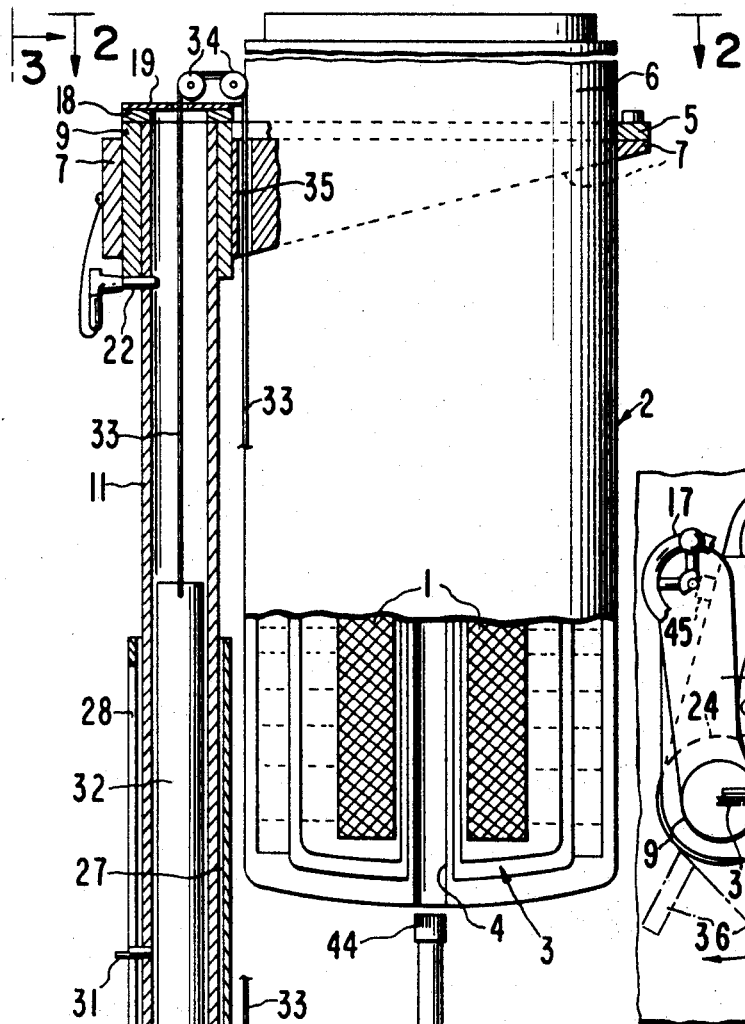

Sept. 17, 1968　　　　　F. A. NELSON　　　　　3,402,347
VERTICAL STAND FOR A SUPERCONDUCTIVE MAGNET HAVING
A VERTICALLY GUIDED PROBE CARRIAGE
Filed April 25, 1966　　　　　　　　　　　2 Sheets-Sheet 1

INVENTOR.
FORREST A. NELSON
BY
ATTORNEY

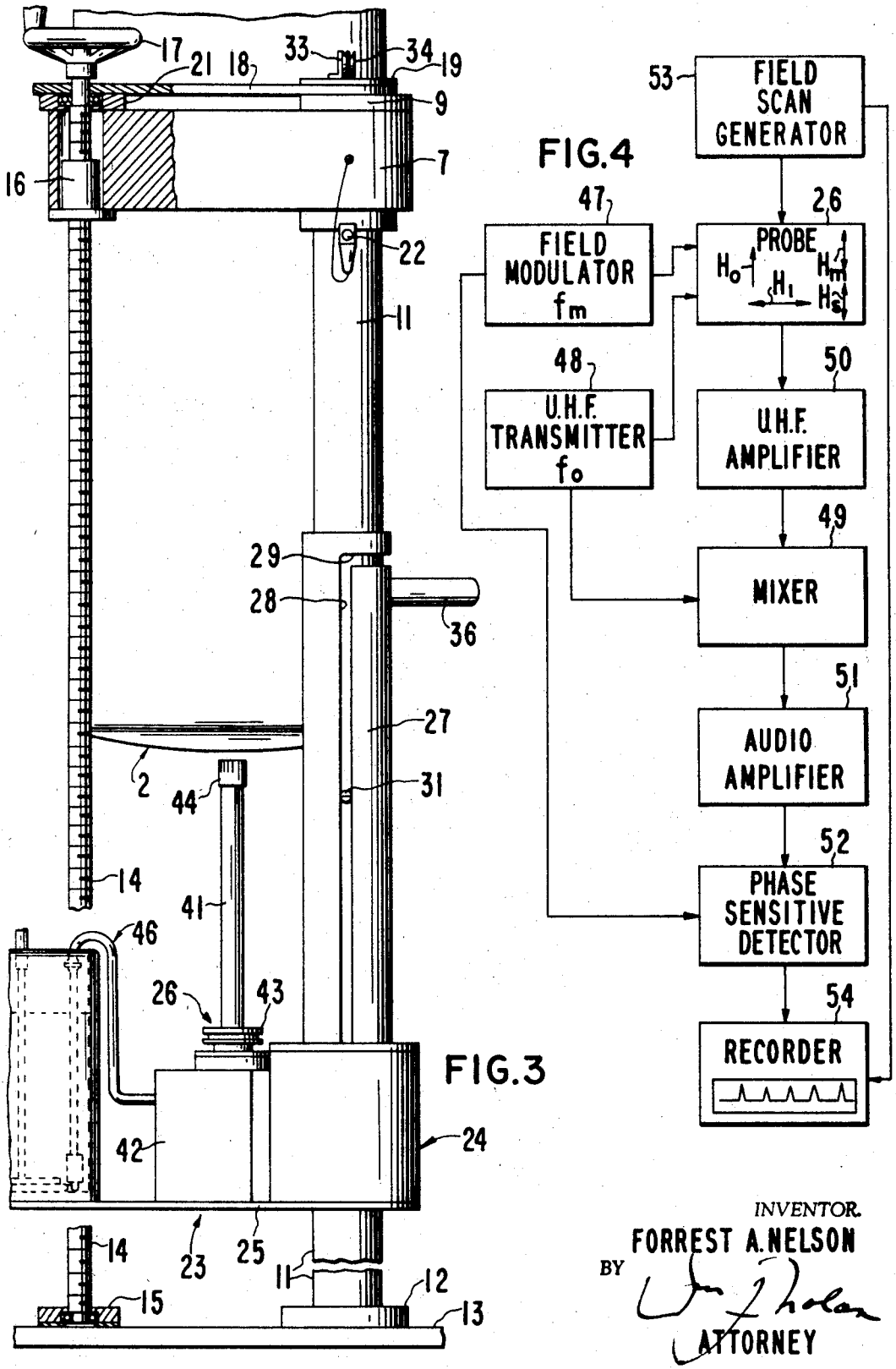

United States Patent Office 3,402,347
Patented Sept. 17, 1968

3,402,347
VERTICAL STAND FOR A SUPERCONDUCTIVE MAGNET HAVING A VERTICALLY GUIDED PROBE CARRIAGE
Forrest A. Nelson, Palo Alto, Calif., assignor to Varian Associates, Palo Alto, Calif., a corporation of California
Filed Apr. 25, 1966, Ser. No. 544,775
12 Claims. (Cl. 324—.5)

The present invention relates in general to stands for superconductive magnets and, more particularly, to an improved stand which supports the superconductive solenoid and its cryostat in a vertical position and which also includes a vertically guided probe carriage for precisely guiding the field utilization probe into the solenoid from a position located below the cryostat. Such an improved stand is especially useful for but not limited to use with a gyromagnetic resonance spectrometer as it readily permits the resonance probe to be withdrawn, for exchange of resonance samples, etc., and quickly reinserted into precisely the same region of the magnetic field.

Heretofore, superconductive magnets have been built which were vertically supported from a stand and which permitted access to the field of the solenoid from the bottom end of its surrounding cryostat. However, in these prior magnet systems no composite auxiliary probe carriage mechanism was provided for the field utilization devices such as, for example, a gyromagnetic resonance probe with its associated equipment. As a consequence it was a cumbersome and time consuming effort for the operator to remove the probe, for exchange of samples or the like, and then to reinsert the probe into essentially the same region of the field.

In a gyromagnetic resonance spectrometer certain ones of the field gradient cancelling coils are mounted in the probe containing the sample. Once the field is corrected with these coils and then probe withdrawn unless the probe is precisely repositioned in exactly the same place, for which the field was originally corrected, the original field correction will no longer be correct. Therefore, the field would have to be recorrected. Moreover, the probe with its associated equipment is typically relatively heavy and unwieldy. Insertion of the probe having very close tolerances with the cryostat into the cryostat from the bottom is an awkward manuever. Also auxiliary equipment associated with the probe, such as heat exchangers with their associated Dewar plumbing had to be disconnected and reassembled to remove the probe from the cryostat.

In the present invention, the vertical magnet stand includes a probe carriage assembly which is guided in its vertical translation such that the field utilization probe assembly may be quickly and accurately inserted, withdrawn and reinserted into the magnet with assurance that the probe will be repositioned in precisely the same region of the field as was obtained in the original position. In a preferred embodiment, the guiding mechanism for the probe carriage also includes means for horizontally translating the probe carriage out from under the magnet after the probe has been withdrawn from the Dewar, whereby access to the probe is facilitated. Moreover the probe carriage is large enough to accommodate the auxiliary equipment such as the probe heat exchangers and associated Dewar plumbing such that the Dewar plumbing does not have to be taken apart and reassembled for withdrawal of the probe.

The principle object of the present invention is the provision of an improved superconductive magnet stand.

One feature of the present invention is the provision of a stand for supporting a superconductive magnet in the vertical direction and including a vertically guided and translatable probe carriage for inserting and withdrawing the field utilization probe within the magnet from below the magnet, whereby removal and reinsertion of the probe is facilitated.

Another feature of the present invention is the same as the preceding feature including the provision of means for translating the probe carriage in the horizontal plane at a point in its vertical travel after the probe has been withdrawn from the magnet, whereby access to the withdrawn probe is facilitated.

Another feature of the present invention is the same as any one or more of the preceding features including the provision of an adjustable stop for precisely determining the vertical position of the probe within the magnet, whereby the probe may be repetitively repositioned in the same region of the field of the magnet.

Another feature of the present invention is the same as any one or more of the preceding including the provision of a heat exchanger Dewar assembly mounted with the probe on the probe carriage whereby the heat exchanger Dewar need not be disconnected or dissassembled to accommodate translation of the probe.

Another feature of the present invention is the provision of a counter weight for counterweighting the weight of the probe carriage to facilitate manual translation of the probe.

Another feature of the present invention is the same as the next preeceding feature wherein the probe carriage is damped at its extremes of travel to prevent transmitting shock to the superconductive solenoid or damage to the magnet assembly.

Figure 2:
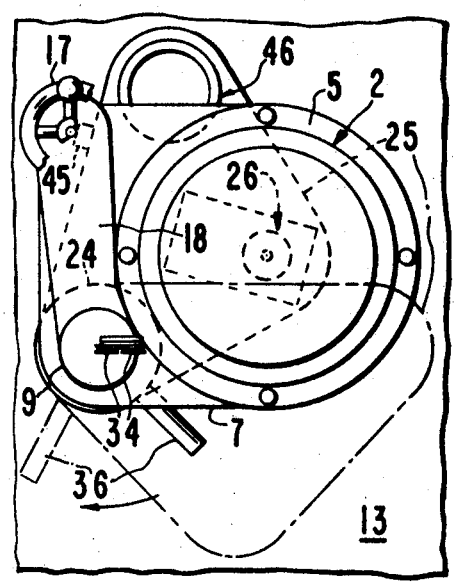

Other features and advantages of the present invention will become apparent upon a perusal of the following specification taken in connection with the accompanying drawings wherein:

FIG. 1 is a foreshortened side elevational view, partly in section, of a superconductive magnet system employing features of the present invention, FIG. 2 is a transverse view, partly broken away of the structure of FIG. 1 taken along line 2—2 in the direction of the arrows, FIG. 3 is a side elevational view, partly broken away, of the structure of FIG. 1 taken along line 3—3 in the direction of the arrows, and FIG. 4 is a schematic block diagram of a gyromagnetic resonance spectrometer used with the magnet system of FIG. 1.

Referring now to FIG. 1 there is shown the magnet system of the present invention. The magnet includes a superconductive solenoid 1 immersed in a liquid helium bath contained within a cylindrical cryostat 2. The cryostat 2 includes a liquid nitrogen and liquid helium Dewar 3. The Dewar 3 has an axially reentrant bore 4, as of 1.135" diameter and 20" in length, entering from the bottom end thereof. The bore 4 passes up into the cryostat 2 centrally of the solenoid 1 to permit access to the strong uniform region of the D.C. magnetic field $H_0$, as of 60 kg. intensity, produced by the solenoid.

The cryostat 2 includes an annular transverse flange member 5 as of ⅜" thick stainless steel plate welded to the outer stainless steel shell 6 of the cryostat 2 at a point approximately midway of its length for supporting the cryostat in the vertical position. The cryostat 2 is about 15" in diameter 51" in length and weighs about 300 pounds including the solenoid 1 and liquid coolant.

A cryostat support carriage 7, as of 6061–T6 aluminum, is centrally apertured at 8 to receive the cryostat 2 slidably inserted therein. The cryostat carriage 7 includes a bearing assembly 9 axially slidable upon a vertically directed shaft 11 forming the main vertical element of a magnet stand. The shaft 11 is, for example, a hollow stainless steel tube having an inside diameter of 2" and an outside diameter of 3" and is 62" long. The bottom end of the shaft 11 is held within a collar 12 mounted near one corner of a square base plate 13, as of 30" square 1" thick aluminum plate.

A vertically directed screw 14 (see FIG. 3) as of stainless steel, bears at one end against the base plate 13 and is captured there by a retaining collar 15. The screw 14 passes through a threaded sleeve 16 affixed to the cryostat carriage 7. A hand crank 17 is affixed on the end of the screw for turning same. A horizontal tie plate 18 is affixed at one end 19 to the hollow vertical shaft 11 and has a bearing 21 in the other end which rides on a nonthreaded portion of the screw 14. The tie plate 18 serves to hold the shaft 11 and screw 14 in parallelism. The cryostat carriage 7 is movable in the vertical direction by turning crank 17 to cause the threaded sleeve 16 with its attached cryostat carriage 7 to move up or down on the screw 14 and shaft 11. A removable locking pin 22 passes through a hole in the shaft 11 below the carriage for locking the carriage in the fully raised position. The cryostat carriage, when in its lowermost extent of travel, facilitates access to the top of the cryostat 2 but in the magnet operating position the carriage is fully raised. A probe carriage assembly 23 is carried from the vertical shaft 11 via a race track ball bearing 24 axially slidable and freely turnable on the shaft 11. A triangular shaped probe support plate 25, as of ¼" aluminum plate, is affixed to the bearing 24 and extends away from the shaft in the horizontal direction for support of a probe assembly 26. A tubular guide member 27 as of 3.025" inside diameter ³⁄₃₂" wall thickness aluminum tubing 18" long, is affixed at its lower end to the bearing 24 and extends along the shaft 11 in concentric spaced relation thereto. The tubular guide member 27 includes a longitudinal slot 28 extending from the lower end to an intersection transverse slot 29 at the upper end. A guide pin 31 is affixed in the shaft 11 and rides in the slots 28 and 29 for guiding the movement of the probe carriage 23 on the shaft 11.

A counter weight 32 as of, for example, a 40 pound cylindrical lead slug, is suspended within the hollow interior of the vertical shaft 11 via a stainless steel ⅛" diameter stranded cable 33. The cable 33 passes out of the upper end of the shaft 11 and over a pair of pulleys 34 and thence down through a bore 35 in the cryostat carriage to the probe carriage bearing 24 to which it is affixed. A handle 36 is affixed to the guide tube 27 for manually raising, lowering and turning the probe carriage as permitted by the guide pin 31 riding in the guiding slots 28 and 29.

The probe assembly 26 includes an elongated upstanding cylindrical neck portion 41 as of 1.10" in diameter and 19" in length to be inserted within the reentrant bore 4 of the cryostat 2. In a gyromagnetic resonance spectrometer, the neck 41 of the probe 26 includes a plurality of concentrically nested cylindrically shaped devices for performing several different functions such as: containing the gyromagnetic resonance sample, spinning the sample, applying ultra high frequency magnetic fields to the sample, picking up ultra high frequency resonance signals from the sample, controlling the temperature of the sample, and controlling the D.C. field gradients over the sample. A housing structure 42 at the base of the neck 41 of the probe 26 contains certain electronic circuitry and means for controlling the temperature and flow of certain gasses coursing through the probe 26. The probe assembly 26 is fixedly mounted on the probe carriage support plate 25. An axially expandable collar 43 is concentrically positioned of the probe neck 41 at the base thereof. The collar 43 serves as an adjustable stop for precisely determining the extent of vertical penetration of the probe neck 41 into the bore 4 of the cryostat 2 by its engagement with the bottom surface of the cryostat 2. A Teflon collar 44 is carried at the upper end of the probe neck 41 and provides a sliding guide for concentrically positioning the probe neck 41 within the bore 4. The collar 44 is longitudinally serrated at its upper end to form a circumferential array of resilient fingers which aid entry of the probe into the bore 4.

For loading the sample under analysis in the probe 26, the probe carriage is lowered by pulling down the handle 36 to its lowest position as determined when the fixed guide pin 31 reaches the intersection of the vertical and transverse slots 28 and 29 in the movable guide tube 27 forming a portion of the probe carriage 23. At this point, the handle 36 is turned around the shaft 11 in the clockwise direction with the guide pin 31 riding in the transverse slot 29 until the probe 26 is swung out from underneath the cryostat 2. In this position, a sample under analysis is inserted into the probe 26 from the top thereof. The handle 36 is then turned around the shaft in the counter clockwise direction until the guide pin 31 engages the edge of the vertical slot 28. The handle 36 is then pushed up along the shaft 11 causing the probe 26 to traverse a path vertical coaxially aligned with the longitudinal axis of the reentrant bore 4 in the cryostat 2. The vertical slot 28 determines the one vertical path for the probe travel that will bring the upper end of the probe 26 into precise registration with the bore 4. As the probe start its entry into the bore 4 the resilient fingers of the Teflon collar 44 engage the side wall of the bore 4 to assure concentricity of the probe neck 41 and bore 4. The handle 36 is pushed to its uppermost extent of travel as determined by engagement of the adjustable collar stop 43 with the bottom of the cryostat 2. The counter weight 32 is made heavier than the probe assembly 26 and carriage 23 such that the probe is urged upwardly into the bore 4 by the counter weight 32 and such that the probe collar stop 43 is held in engagement with the bottom surface of the cryostat 2. The hollow shaft 11 is partially filled with a viscous oil to such a level that the downward motion of the counter weight 32 is partially arrested by viscous damping at its point in travel corresponding to a full insertion of the probe 41 into the bore 4. In this manner, the rate of the probe's vertical motion is greatly reduced as it nears its uppermost extent of travel to prevent mechanical shock from being transmitted to the cryostat 2 upon engagement of the stop 43 with the bottom surface of the cryostat 2. Also a dash pot 45 is mounted on the base plate 13 to engage the edge of the horizontal probe carriage plate 25 and arrest its horizontal translation as the probe carriage 23 reaches its innermost extent of horizontal translation. In this manner mechanical shock is prevented from being transmitted to the probe 26 or magnet stand when the vertical guide pin 31 engages the vertical edge of the vertical guide slot 28.

A liquid nitrogen heat exchange Dewar assembly 46 is also mounted on the probe carriage 23 for cooling gas, such as nitrogen, supplied to the probe 26 for cooling or controlling the temperature of the sample inside the probe 26. The Dewar assembly comprises a liquid nitrogen Dewar container having a spiral copper tube immersed therein for cooling the nitrogen gas supplied from a source, not shown, via flexible tubing. The cooled nitrogen gas is fed to a heat exchanger mounted in the probe housing 42 via a glass Dewar pipe. By mounting the heat exchanger Dewar assembly 46 on the probe carriage 23 the probe 26 may be moved in and out of the cryostat 2 without having to disconnect the Dewar heat exchanger 46 from the probe housing 42.

Referring now to FIG. 4 there is shown the electrical circuitry for observing the gyromagnetic resonance spectrum of the sample under analysis. A field modulator 47 superimposes an alternating magnetic field component $H_m$, at a convenient audio frequency, as of 10 kHz., on the D.C. field $H_0$ over the sample volume within the probe 26. An ultrahigh frequency transmitter 48 applies an alternating magnetic field $H_1$ to the sample at a frequency $f_0$ displaced in frequency from the gyromagnetic resonance frequency $f_c$ of the sample by the field modulation frequency $f_m$. The UHF magnetic field $H_1$ is polarized at right angles to the D.C. field. Under these conditions, gyromagnetic resonance of the sample is excited at $f_c$, which may be on the order of 220 mHz. The excited resonance is frequency modulated having a carrier resonance component at $f_c$ and Bessel function amplitude sidebands at frequency intervals separated in frequency by the field modulation frequency $f_m$. The F.M. resonance signal emanating from the sample is picked up in a receiver coil located within the probe 26 and fed to UHF amplifier 50 and thence to a mixer 49. In the mixer, the resonance signal is mixed with a simple of the transmitter signal to obtain an audio frequency resonance signal at the field modulation frequency $f_m$. The resonance signal is then amplified by audio amplifier 51 and fed to one input of a phase sensitive detector 52 wherein it is compared with a sample of the field modulation signal to obtain a D.C. resonance output signal. The D.C. polarizing magnetic field $H_0$ is scanned through the resonance spectrum of the sample under analysis by superimposing a scan field component $H_s$, obtained from a scan generator 53, upon the polarizing field $H_0$ over the sample volume. The D.C. output resonance signal from the phase sensitive detector 52 is fed to a recorder 54 for recording as a function of time or scan field intensity as obtained from the scan generator 53.

Although the superconductive magnet system of the present invention has been explained as it would be used in conjunction with a gyromagnetic resonance spectrometer, it may be used with other types of field utilization devices wherein a sample is inserted into an intense magnetic field.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A superconductive magnet apparatus including, means forming a superconductive solenoid for producing an intense magnetic field within its interior region, means forming a cryostat enveloping said solenoid for cooling said solenoid to superconductive temperature, said cryostat having a reentrant bore extending coaxially of and into the central region of said solenoid, means forming a stand for supporting said cryostat and solenoid with said bore being vertically directed into said cryostat from the bottom of said cryostat, said stand means including a vertically translatable probe support carriage for vertically inserting and withdrawing a probe within said reentrant bore from below said cryostat, and said stand means further including means for horizontally guiding the vertical movement of said probe carriage to one predetermined vertical path which brings the vertical path of the probe into coaxial registration with the vertical axis of said reentrant bore, whereby vertical insertion of the probe into said bore of said cryostat is facilitated.

2. The apparatus of claim 1 wherein said guiding means forms a portion of said carriage means.

3. The apparatus of claim 1 including means forming an adjustable stop for limiting the uppermost vertical movement of said probe carriage, whereby repositioning of the probe is facilitated.

4. The apparatus of claim 1 including means for counterweighting said probe carriage means to facilitate vertical translation of said carriage means.

5. The apparatus of claim 1 wherein said guiding means includes means for allowing horizontal translation of said probe carriage at the lowermost extent of said carriage's vertical travel, whereby the probe may be moved out from under said cryostat to facilitate access to the probe when the probe is withdrawn from said cryostat.

6. The apparatus of claim 1 including a probe structure affixed to said probe carriage, and said probe structure having an elongated vertically directed portion for insertion into said reentrant bore of said cryostat.

7. The apparatus of claim 6 including in combination, means for exciting gyromagnetic resonance of a sample of matter contained in said probe structure, while immersed in the magnetic field of said solenoid and means for detecting gyromagnetic resonance of the excited sample within said probe to obtain an output gyromagnetic resonance signal.

8. The apparatus of claim 1 wherein said stand means includes a vertically directed shaft, and wherein said carriage means includes; a horizontally directed platform member for supporting the probe assembly, a bearing member fixedly secured to said platform and coaxially mounted of said shaft for accommodating axially slidable translation of said bearing and platform member along said shaft in the vertical direction.

9. The apparatus of claim 8 wherein said carriage means further includes an elongated tubular member movable therewith and concentrically disposed of said shaft, said tubular member having an axially directed elongated slot therein forming a vertical track portion of said guiding means, and a guide pin secured to said shaft and riding in said slot for guiding the vertical movement of said probe carriage means.

10. The apparatus of claim 9 wherein said shaft is hollow, a counter weight movable within the hollow shaft, and a cable interconnecting said counter weight and said probe carriage for counter weighting said probe carriage means.

11. The apparatus of claim 4 including means for damping the movement of said counter weight means at its lowermost extent of travel, whereby mechanical shock is not transmitted from said probe to said solenoid.

12. The apparatus of claim 6 including a heat exchanger Dewar assembly mounted on said probe carriage, whereby said Dewar assembly need not be disconnected from said probe structure for movement of said probe.

No references cited.

RUDOLPH V. ROLINEC, *Primary Examiner.*

M. J. LYNCH, *Assistant Examiner.*